(12) United States Patent
Fjerdingstad

(10) Patent No.: US 8,713,741 B2
(45) Date of Patent: May 6, 2014

(54) APPARATUS AND METHOD FOR CLEANING PIPES AND PIPE SYSTEMS

(75) Inventor: Sølve J. Fjerdingstad, Ås (NO)

(73) Assignee: Fras Technology AS, Ovre Ardal (FR)

(*) Notice: Subject to any disclaimer, the term of this patent is extended or adjusted under 35 U.S.C. 154(b) by 804 days.

(21) Appl. No.: 12/438,432

(22) PCT Filed: Aug. 22, 2007

(86) PCT No.: PCT/NO2007/000295
§ 371 (c)(1),
(2), (4) Date: Aug. 12, 2010

(87) PCT Pub. No.: WO2008/023992
PCT Pub. Date: Feb. 28, 2008

(65) Prior Publication Data
US 2010/0300485 A1 Dec. 2, 2010

(30) Foreign Application Priority Data

Aug. 22, 2006 (NO) .................................. 20063766

(51) Int. Cl.
*B08B 9/04* (2006.01)
*B08B 9/053* (2006.01)
*B08B 9/02* (2006.01)
*F28G 1/12* (2006.01)
*F16L 55/46* (2006.01)
*F16L 101/12* (2006.01)

(52) U.S. Cl.
CPC . *B08B 9/053* (2013.01); *B08B 9/04* (2013.01); *B08B 9/02* (2013.01); *F28G 1/12* (2013.01); *F16L 55/46* (2013.01); *F16L 2101/12* (2013.01)
USPC .................. 15/104.062; 15/104.05; 134/8

(58) Field of Classification Search
CPC ............ B08B 9/02; B08B 9/04; B08B 9/053; F16L 2101/12; F16L 55/46; F28G 1/12
USPC ............. 134/8, 22.1, 22.11, 22.12, 22.18, 24; 15/3.5, 3.51, 3.52, 104.062, 104.05; 165/5, 11.1, 95
See application file for complete search history.

(56) References Cited

U.S. PATENT DOCUMENTS 3,676,091 A 7/1972 Fraser et al.
4,416,703 A 11/1983 Scott
(Continued)

FOREIGN PATENT DOCUMENTS

| DE | 33 06 378 | 8/1984 |
| FR | 2 605 253 | 4/1988 |
| JP | 55-168270 | 11/1980 |
| JP | 59-213487 | 12/1984 |

(Continued)

OTHER PUBLICATIONS

Office Action with English translation dated Jan. 31, 2012 issued in corresponding Japanese Application No. 2009-525515.

(Continued)

*Primary Examiner* — Alexander Markoff
(74) *Attorney, Agent, or Firm* — Finnegan, Henderson, Farabow, Garrett & Dunner, L.L.P.

(57) ABSTRACT

An apparatus (50) is provided for use in internal cleaning of at least one pipe (10), which apparatus (50) is arranged for connection to a first pipe end (14) of the at least one pipe (10) and to a second pipe end (15) of the at least one pipe, wherein the apparatus (50) at least comprises a coupling device designed for connection to a reservoir of pressurized gas, a pressure chamber (20) for introduction of cleaning pigs (21) and a pig receiver (23) for receiving cleaning pigs (21) which have passed through the at least one pipe (10). The apparatus (50) further comprises a pressure booster (29) for pressurizing a liquid fluid and at least one valve means (16,17) so as to allow a cleaning pig (21) to be driven through the at least one pipe (10) by means of either the pressurized gas or the pressurised liquid fluid.

5 Claims, 1 Drawing Sheet

(56) References Cited

U.S. PATENT DOCUMENTS

| | | | |
|---|---|---|---|
| 4,447,925 A | | 5/1984 | Riedel |
| 5,027,466 A | * | 7/1991 | Crawford ................ 15/104.062 |
| 5,370,005 A | | 12/1994 | Fjerdingstad |
| 5,444,886 A | | 8/1995 | Takashina et al. |
| 5,882,428 A | | 3/1999 | Gawne |
| 5,891,260 A | * | 4/1999 | Streets et al. ..................... 134/8 |
| 6,170,493 B1 | * | 1/2001 | Sivacoe ............................. 134/8 |
| 6,391,121 B1 | | 5/2002 | Sivacoe |
| 6,569,255 B2 | | 5/2003 | Sivacoe |
| 2001/0003307 A1 | * | 6/2001 | Sivacoe .......................... 165/95 |
| 2001/0047811 A1 | * | 12/2001 | Sivacoe ............................. 134/8 |
| 2002/0185261 A1 | * | 12/2002 | Sivacoe .......................... 165/95 |

FOREIGN PATENT DOCUMENTS

| | | |
|---|---|---|
| JP | 09-268643 | 10/1997 |
| JP | 2000-193199 | 7/2000 |
| JP | 2002-295772 | 9/2002 |
| JP | 2005-040742 | 2/2005 |
| NO | 171430 | 9/1990 |
| WO | WO 99/23438 | 5/1999 |
| WO | WO 02/068109 | 9/2002 |
| WO | WO 2006/048407 A1 | 5/2006 |

OTHER PUBLICATIONS

European Patent Office, "Supplementary European Search Report," issued in EP application No. 07 79 39 32 Feb. 21, 2013, 8 pages.

* cited by examiner

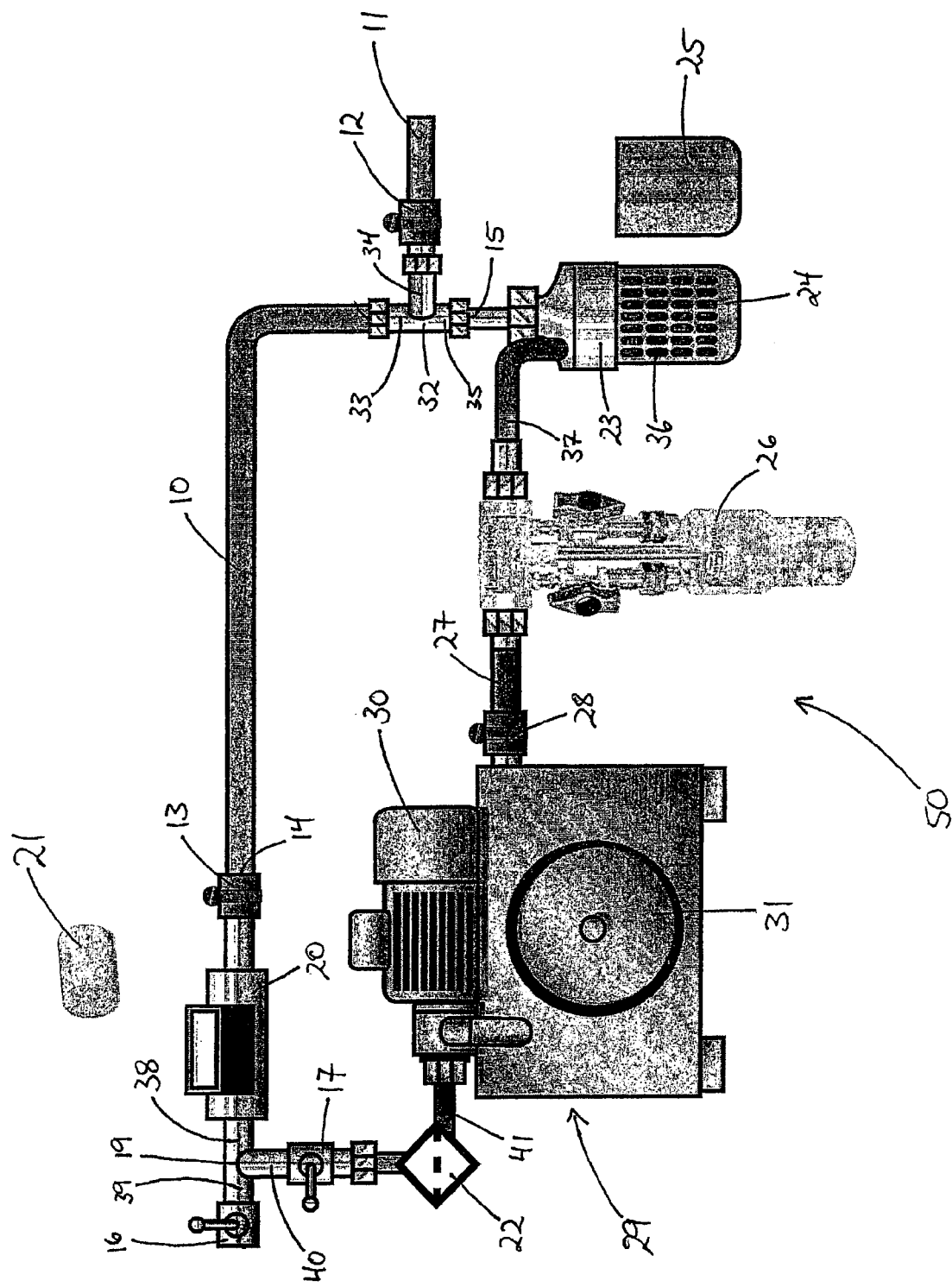

APPARATUS AND METHOD FOR CLEANING PIPES AND PIPE SYSTEMS

BACKGROUND OF THE INVENTION

The present invention relates to an apparatus and a method for cleaning a pipe or a pipe system and a method for cleaning and verifying the cleanliness of the pipe or pipe system after completed cleaning.

Today, large transportable flush units are often used for cleaning pipes and pipe systems when there is no permanently installed equipment for pigging the pipe or pipe system. Such known flush units are large and cannot be handled without using cranes or the like because they require a high oil pressure and a substantial flow of liquid. This makes the work more complicated; it takes more time and requires more resources. Moreover, the known systems do not give satisfactory results when a high degree of cleanliness in the pipes is required, especially, for example, in the areas right against the pipe wall and at pipe joints.

Another problem with known systems is verification of cleanliness after the cleaning of the pipe or pipe system has been completed, when a certain standard of cleanliness is required. In many cases it is in fact a requirement that a satisfactory degree of cleanliness can be proven. This is, inter alia, the case in the petroleum industry. Eighty percent of all faults in hydraulic systems can be related to the particle cleanliness of the hydraulic oil. The formula for load-life calculations for ball and roller bearings is, inter alia, calculated based on particle concentration and water content of the oil. This is the basis for lifetime and reliability calculations for critical machine installations.

Systems for cleaning a pipe are already known from U.S. Pat. No. 5,444,886. This document teaches a system with a combined unit for launching and receiving a pig at each end of the pipe to be cleaned. The pig is driven through the pipe by a pressurised gas.

U.S. Pat. No. 6,391,121 B1 teaches a permanently installed system for cleaning the tubing of a heater where a combined launching and receiving unit is provided on either side of the heater. In addition, a parallel connection of the pipe and a pump is provided so that the pigs can be run back through the parallel connection.

It is therefore an object to provide a cleaning system that is substantially smaller and lighter than known systems and which therefore can be transported and handled with relative ease.

It is a further object of the invention to provide a cleaning system and a method for cleaning pipes and pipe systems which increase the degree of cleanliness after cleaning compared with existing systems, especially in problem areas of the pipes such as pipe joints and close to the surface of the pipes where turbulent flow is necessary to remove particles that are found on the interior walls of the pipe.

It is also an object to provide a cleaning system that is capable of verifying the internal cleanliness of the pipes after the cleaning operation.

SUMMARY OF THE INVENTION

An apparatus is described for use in the internal cleaning of pipes and pipe systems. The apparatus is arranged so as to be capable of being connected to a first pipe end of the pipe or pipe system and to a second pipe end of the pipe or pipe system that is to be cleaned. The apparatus will in general comprise at least a coupling device which is designed for connection to a reservoir of a pressurised gas, a pressure chamber in which the cleaning pigs are placed and which acts as a launching unit for the cleaning pigs. If the pressurised gas is provided through a pipe or a hose, the coupling device may, for example, be a standard quick release coupling designed to be used for such a purpose. If the pressurised gas is provided in another manner, an adapted coupling device will then have to be used. The apparatus further comprises a pig receiver for receiving cleaning pigs that are sent through the pipe or pipe system and a pressure booster for pressurising a liquid fluid. This liquid fluid is preferably a hydraulic oil, but other types of liquid fluids can also be used if appropriate. The apparatus also comprises at least one valve means so that a cleaning pig can be driven through the at least one pipe with the aid of the pressurised gas or the pressurised liquid fluid. It is also conceivable that two valves can be used, each valve in that case admitting and shutting off the supply of the pressurised gas or the liquid fluid, respectively. Other solutions may be chosen if desired, provided the apparatus allows cleaning pigs to be driven through the at least one pipe to be cleaned either by using pressurised gas or a pressurised liquid fluid and that it is possible to alternate between the use of a pressurised gas and a pressurised liquid fluid.

If necessary, the apparatus can also be provided with a sampler for sampling the liquid fluid after it has flowed through the pipe or pipe system. Such a sampler may be as described in the Applicant's own Norwegian Patent NO 171430, or another type of sampler that is capable of taking a representative sample of the oil or of counting particles in the oil so that the degree of cleanliness of the pipe or pipe system can be determined accurately.

The sampler may also be provided with means for adding an antimicrobial agent, as for example, Biocid, to reduce microbial growth on the pipe surface.

In a preferred embodiment, the apparatus is connected to the first pipe end and the second pipe end of the at least one pipe in such manner that the apparatus and the at least one pipe to be cleaned form a fluid flow circuit.

To carry out the cleaning process in which cleaning pigs are driven through the pipe or pipe system with the aid of a pressurised gas or a liquid fluid, the pig receiver is provided with an interchangeable pig basket for receiving cleaning pigs. When the cleaning pig is driven through the pipe with the aid of the pressurised gas, the pig receiver pig basket is configured with through apertures to allow the pressurised gas to be released.

Correspondingly, the pig receiver's pig basket for use when the cleaning pig is driven through the pipe with the aid of the pressurised liquid fluid is fluid-tight.

The liquid fluid will preferably be circulated in the fluid flow circuit when the apparatus is configured so as to form such a circuit together with the pipe or pipe system.

The pressure booster preferably comprises a container for storing the liquid fluid.

Furthermore, a method is provided for cleaning pipes and pipe systems wherein an apparatus is used that is connected to a pipe or a pipe system to be cleaned at a first pipe end and a second pipe end of the pipe or pipe system. The apparatus comprises at least a coupling means for connection to a reservoir of a pressurised gas, a pressure chamber for introduction of cleaning pigs, a pig receiver for receiving cleaning pigs that are sent through the at least one pipe, and a pressure booster for pressurising a liquid fluid. During the cleaning of the at least one pipe, the following steps are carried out:

at least one solid cleaning pig is sent through the at least one pipe, driven by the pressurised gas;
at least one solid cleaning pig is sent through the at least one pipe, driven by the pressurised liquid fluid;

at least one adjustable cleaning pig is sent through the at least one pipe, driven by the pressurised liquid fluid for verification.

In each of the above steps, just one pig may be launched, or if required, two or more pigs can be launched in one or more or all of the steps. It is in the last step, where an adjustable pig is sent through the pipe, that the desired cleaning effect right against the pipe wall and in pipe joints is achieved. Such cleaning pigs, with an adjustable diameter, are generally known and are therefore not discussed further here.

In a preferred embodiment, the apparatus and the pipe or pipe system to be cleaned are joined in such manner that together they form a fluid flow circuit so that a fluid can circulate in the fluid flow circuit.

In a preferred embodiment an antimicrobial agent, as for example Biocid, is added to the liquid fluid before it flows through the pipe or pipe system.

When a pig that is driven by the pressurised gas is sent through the pipe or pipe system, the pig receiver is used with a pig basket configured with through apertures to allow the pressurised gas to be released.

When the pig is driven by the pressurised liquid fluid through the pipe or pipe system, the pig receiver is used with a pig basket that is fluid-tight.

A method is also provided for cleaning and verifying the cleanliness of a pipe or pipe system wherein an apparatus is used that is connected to a pipe or pipe system to be cleaned at a first and a second end of the pipe or pipe system. The apparatus comprises at least a coupling device designed for connection to a reservoir of pressurised gas, a pressure chamber for introduction of cleaning pigs, a pig receiver for receiving cleaning pigs that are sent through the at least one pipe, a pressure booster for pressurising a liquid fluid, and a sampler capable of taking samples of the liquid fluid after it has flowed though the at least one pipe. During the cleaning of the pipe or pipe system and verification of the cleanliness of the pipe or pipe system, the following steps are carried out:
- at least one solid cleaning pig is sent through the at least one pipe, driven by the pressurised gas;
- at least one solid cleaning pig is sent through the at least one pipe, driven by the pressurised liquid fluid;
- at least one adjustable cleaning pig is sent through the at least one pipe, driven by the pressurised liquid fluid; and
- using the sampler, at least one sample is taken of the pressurised liquid fluid that has flowed through the at least one pipe.

The sampler takes at least one sample of the pressurised, liquid fluid after the last cleaning pig has been sent through the at least one pipe, but more samples may of course be taken, both during the cleaning process and when the, initially, last cleaning pig has been sent through the pipe or pipe system.

If desirable, an antimicrobial agent, as for example Biocid, can be added to the pressurised liquid fluid before it flows through the at least one pipe. This may, for example, be done in the sampler. A sampler that is provided with means for adding such an antimicrobial agent is described in the Applicant's Norwegian Patent NO 171430.

In a preferred embodiment, the apparatus and the pipe or pipe system are joined in such manner that together they form a fluid flow circuit so that a liquid fluid can circulate in the fluid flow circuit.

When a pig is driven through the pipe or pipe system by the pressurised gas, it is preferable to use the pig receiver with a pig basket configured with through apertures for release of the pressurised gas.

When a pig is driven through the pipe or pipe system by the pressurised liquid fluid it is preferable to use the pig receiver with a pig basket that is fluid-tight.

BRIEF DESCRIPTION OF THE DRAWING

FIG. 1 shows an apparatus for the cleaning of a pipe according to the present invention.

DETAILED DESCRIPTION OF THE INVENTION

An embodiment of the invention will be described in detail below with reference to the attached FIGURE which shows how a system for cleaning a pipe or pipe system according to the invention can be set up.

FIG. 1 shows an apparatus 40 for cleaning a pipe 10 or a pipe system consisting of several pipes, such as the pipes 10,11 illustrated here. The pipes 10,11 in the pipe system are joined by a T-shaped pipe fitting 32, where the pipe 10 is connected to a first branch 33 of the T-shaped pipe fitting 32 and the pipe 11 is connected to a second branch 34 via a valve 12 that can close the pipe 11 when the pipe 10 is to be cleaned. A pressure chamber 20 is connected via a valve 13 at a first pipe end 14 of the pipe 10. The pressure chamber 20 acts as a launching unit for cleaning pigs 21.

At the other end, the pressure chamber 20 is connected to a first branch 38 of a T-shaped pipe fitting 19. A source of pressurised gas, as for instance air, may be connected to the second branch 39 of the T-shaped pipe fitting 19 by means of a suitable coupling device (not shown). A supply of the pressurised gas to the pressure chamber 20 may be admitted and shut off by means of a valve 16.

A pressure booster 29 comprising a pump 30 that pumps a liquid fluid is connected to a third branch 40 of the T-shaped pipe fitting 19. The pressure booster 29 also comprises a tank 31 for storing the liquid fluid. A supply of the liquid fluid to the pressure chamber 20 can be admitted and shut off by means of a valve 17. The liquid fluid is preferably a hydraulic oil, but if appropriate, other types of liquid fluids may also be used. A filter 22 through which the liquid fluid passes may advantageously be disposed between the pressure booster 29 and the T-shaped pipe fitting 19.

The FIGURE shows an embodiment of the invention that employs two valves 16,17 for admitting and shutting off the supply of respectively pressurised gas and a liquid fluid. An alternative embodiment will employ a single valve instead of the T-shaped pipe fitting 19, which valve has three positions, a first position in which it admits supply of pressurised gas and shuts off supply of liquid fluid, a second position in which it admits supply of liquid fluid and shuts off supply of pressurised gas, and a third position in which it shuts off supply of both pressurised gas and liquid fluid.

A pig receiver 23 comprising a pig basket 24,25 for catching cleaning pigs 21 that are sent through the pipe 10 is connected to the third branch 34 of the T-shaped pipe fitting 32. In the FIGURE only one cleaning pig 21 is shown in a merely schematic form. During the cleaning process of the pipe 10, several different types of cleaning pigs will be launched, so that even though the FIGURE only shows one cleaning pig it must be understood that in reality this schematically drawn pig represents several different types of cleaning pigs.

In the FIGURE, a pig basket 24, for use when the cleaning pig 21 is driven through the pipe 10 with the aid of pressurised gas, is mounted on the pig receiver 23. This pig basket 24 is provided with a suitable number of apertures 36 for release of the pressurised gas. The other pig basket 25 is fluid-tight and therefore has no holes or through apertures and is mounted on the pig receiver 23 before cleaning pigs 21 are driven through the pipe 10 with the aid of a liquid fluid.

The embodiment of the apparatus 40 shown in the FIGURE is provided with a sampler 26 for sampling the liquid fluid that has flowed through the pipe 10. The sample can be analysed and, on the basis of the result of the analysis, the degree of cleanliness in the pipe 10 can be verified. When a sampler 26 is provided in the apparatus 40, it can, as shown in the FIGURE, be connected to the pig receiver 23 by a hose 37. Furthermore, a return hose 27 is connected from the sampler to the pressure booster 29 via a valve 28.

There may also be cases where verification of the cleanliness of the pipe or pipe system after cleaning is not required. It is then unnecessary to provide a sampler 26 in the apparatus 40. There will thus be an embodiment where the sampler 26 and the hose 37 are not included in the apparatus 40. In this case, the return hose 27 is connected directly to the pig receiver 23.

In the FIGURE, the apparatus 40 and the pipe 10 form a fluid flow circuit in which the liquid fluid can circulate. This is the preferred embodiment of the invention, but it is also possible to have an embodiment where the fluid does not circulate in a fluid flow circuit. It is possible that at the point where the pipes 10,11 are located, there is also access to a liquid fluid under pressure which can be used to drive the cleaning pig 21. The hose 41 can in such a case be connected to the reservoir. The return hose 27 can then empty the liquid fluid into a receptacle of a suitable kind. It is also conceivable that the pressure booster 29 is equipped with a fluid tank 31 which has the capacity to hold a sufficient amount of liquid fluid for conducting the cleaning of the pipe 10 without the liquid fluid circulating, but instead being collected in a receptacle.

When carrying out the cleaning process, a cleaning pig 21 having a solid form will, in a first step, be sent through the pipe 10. The valve 17 for supply of the liquid fluid is kept closed during this step. The cleaning pig 21 is placed inside the pressure chamber 20 and the pressure chamber 20 is closed, and the pig basket 24 that is provided with apertures 36 is mounted on the pig receiver 23. The valve 16 is opened to admit a supply of pressurised gas so that the cleaning pig 21 is driven through the pipe 10 and performs a rough cleaning of the pipe 10. When the cleaning pig 21 has passed through the pipe 10, it is caught in the pig basket 24 and the pressurised gas that drives the cleaning pig through the pipe 10 is released through the apertures 36. If necessary, this operation can be carried out several times.

In the second step of the cleaning process, a cleaning pig 21 having a solid form will also be sent through the pipe 10. The valve 16 for supply of the pressurised gas is kept closed during this step. The cleaning pig 21 is placed inside the pressure chamber 20 and the pressure chamber 20 is closed, and the fluid-tight pig basket 25 is mounted on the pig receiver 23. The valve 17 is opened to admit a supply of the liquid fluid under pressure so that the cleaning pig 21 is driven through the pipe 10 and cleans the pipe 10 whilst the liquid fluid collects and removes unwanted particles. When the cleaning pig 21 has passed through the pipe 10, it is caught in the pig basket 25 and the liquid fluid that drives the cleaning pig through the pipe 10, flows on through the hose 37 to the sampler 26 if the apparatus 50 is provided with such a sampler 26, or out through the return hose 27 if a sampler 26 is not provided in the apparatus 50. If necessary, this operation can also be carried out several times.

In the third step of the cleaning process, an adjustable cleaning pig 21 is sent through the pipe 10. This adjustable cleaning pig 21 is configured so that its diameter can be adjusted to allow the cleaning pig to be pressed against the inner wall of the pipe 10 at a desired pressure. What the desired pressure is in each case will to a great extent be an empirical matter that a person of skill in the art will be able to decide on or arrive at by trial and error. The adjustable cleaning pig creates turbulence in the liquid fluid which will contribute to a better cleaning right in against the pipe wall and in pipe joints. The valve 16 for supply of the pressurised gas is kept closed during this step. The adjustable cleaning pig 21 is placed inside the pressure chamber 20 and the pressure chamber 20 is closed. The fluid-tight pig basket 25 is kept on the pig receiver 23. The valve 17 is opened to admit a supply of the liquid fluid under pressure so that the adjustable cleaning pig 21 is driven through the pipe 10 and cleans the pipe 10 in particular right in against the pipe wall and in pipe joints where other known cleaning systems are not effective. When the cleaning pig 21 has passed through the pipe 10, it is caught in the pig basket 25 and the liquid fluid that drives the cleaning pig through the pipe 10, flows on out through the hose 37 to the sampler 26 if the apparatus 50 is provided with such a sampler 26, or out through the return hose 27 if a sampler 26 is not provided in the apparatus 50. If necessary, this operation can also be carried out several times.

In one embodiment of the invention, it has been taken into account that it is not always enough simply to clean the pipes according to a given procedure, but that it is also necessary to be able to verify that the pipe has a desired degree of cleanliness. For such cases, the apparatus 50 will preferably be provided with a sampler 26 as described above, and in addition to the three steps for cleaning a pipe 10, also as described above, there will be a fourth step in which a sample of the liquid fluid that has flowed through the pipe 10 is taken in the sampler 26. This sample is analysed and if the result is satisfactory, i.e., that the number of particles per volume unit of the liquid fluid is below a certain level, it is verified that the cleaned pipe 10 has a sufficient degree of cleanliness in accordance with the standards that are set.

In the above, a sampler 26 is provided which takes a sample of the liquid fluid which is subsequently analysed. Instead of a sampler, it is conceivable that a particle counter may be used which counts the number of particles per volume unit of the liquid fluid so that it can similarly be verified that the cleaned pipe has the necessary cleanliness in relation to the standards set.

It should also be mentioned that the sampler 26 may be provided with means for adding an antimicrobial agent such as Biocid to the liquid fluid for combating microbial growth on the surface of the pipe 10.

The invention claimed is:

1. An apparatus for use in the internal cleaning of at least one pipe, which apparatus is arranged for connection to a first pipe end of the at least one pipe and to a second pipe end of the at least one pipe, the apparatus comprising a coupling device designed for connection to a reservoir of a pressurised gas, a pressure chamber for introduction of cleaning pigs, which is fluidly connected to the coupling device and fluidly connectable to the at least one pipe, a pig receiver and two interchangeable pig receive pig baskets for receiving cleaning pigs that have passed through the at least one pipe, wherein the apparatus further comprises a pressure booster for pressurising a liquid fluid, the pressure booster being fluidly connected to the pressure chamber, and at least one valve means so as to allow a cleaning pig to be driven through the at least one pipe with aid of either the pressurised gas or a pressurised liquid fluid pressurised by the pressure booster, and wherein the pig receiver is provided with one of said two interchangeable pig receiver pig baskets for receiving cleaning pigs, wherein one of said two pig receiver pig baskets for use when the cleaning pig is driven through the at least one pipe by the pressurised gas is configured with through apertures for release of the pressurised gas and wherein the other of said two pig receiver pig baskets for use when the cleaning pig is driven through the at least one pipe by the pressurised liquid fluid is fluid-tight.

2. An apparatus according to claim 1, wherein the apparatus also comprises a sampler for sampling the liquid fluid after it has flowed through the at least one pipe.

3. An apparatus according to claim 2, wherein the sampler is provided with means for adding an antimicrobial agent.

4. An apparatus according one of claims 1-3, wherein the apparatus and the at least one pipe form a fluid flow circuit when the apparatus is connected to the first pipe end and second pipe end of the at least one pipe.

5. An apparatus according to any one of claims 1-3, wherein the pressure booster comprises a pump and a fluid tank for storing the liquid fluid.

\* \* \* \* \*

UNITED STATES PATENT AND TRADEMARK OFFICE
CERTIFICATE OF CORRECTION

PATENT NO. : 8,713,741 B2  
APPLICATION NO. : 12/438432  
DATED : May 6, 2014  
INVENTOR(S) : Sølve J. Fjerdingstad It is certified that error appears in the above-identified patent and that said Letters Patent is hereby corrected as shown below:

On the Title Page, Item (73), in the Assignee, "Ovre Ardal (FR)" should read --Ovre Ardal (NO)--.

In The Claims

In claim 4, column 7, line 13, "according one" should read --according to one--.

Signed and Sealed this
Twenty-fourth Day of March, 2015

Michelle K. Lee
*Director of the United States Patent and Trademark Office*